G. Waters,
Steam Condenser
No. 106,972. Patented Aug. 30, 1870.

Witnesses:
C. L. Fisher
H. D. Peck

Inventor,
G. Waters

UNITED STATES PATENT OFFICE.

GARDNER WATERS, OF CINCINNATI, OHIO, ASSIGNOR OF ONE-FOURTH TO JAMES J. BUTLER, OF SAME PLACE.

IMPROVEMENT IN FEED-WATER HEATERS.

Specification forming part of Letters Patent No. 106,972, dated August 30, 1870.

*To all whom it may concern:*

Be it known that I, G. WATERS, of Cincinnati, in the county of Hamilton and State of Ohio, have invented certain Improvements in Feed-Water Heaters and Purifiers, of which the following is a specification.

My invention consists in a method of heating and purifying feed-water for steam-generators before the same enters the boilers, and in apparatus in which the same may be practiced. The heating is caused by steam, either direct or exhaust. The purification is effected by bringing steam in contact with the water to be purified before it has entered the steam-generator, which, in consequence of its being thoroughly heated, is caused to precipitate the matter held in solution, and thereby prevent incrustation in the boilers.

Figure 1:
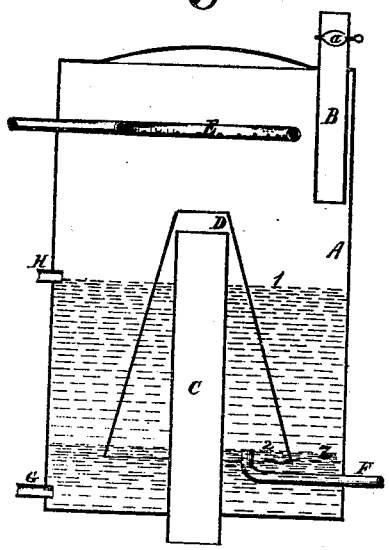
Figure 2:
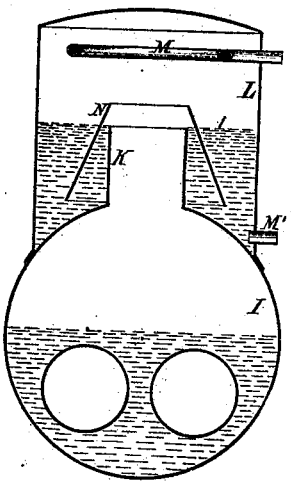
Figure 3:
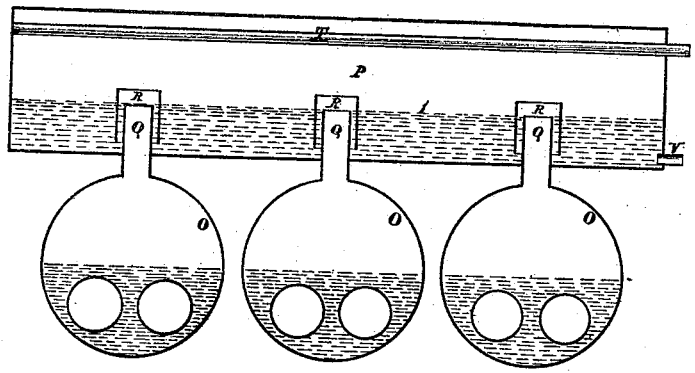

Figure 1 is a vertical section of an apparatus in which my invention may be practiced when exhaust-steam is used. Fig. 2 is a similar view of such apparatus modified so that steam direct from the boilers may be used. Fig. 3 shows its adaptation to a stack of boilers.

In Fig. 1, A is the shell or main body of the heater, made of cast or sheet iron.

C is the exhaust-steam pipe leading through and terminating above the overflow-pipe H.

B is a continuance of the exhaust-steam pipe, leading out of the top of the heater.

$a$ is a valve for preventing the escape of the exhaust-steam when necessary in blowing off the refuse matter from the heater.

E is the pipe for supplying water, which terminates in a ring whose diameter is larger than the top of the guard D. Said ring is above the lower end of the pipe B and the top of guard D, and has its periphery perforated for the passage of the water into the vessel A, outside the circumference of the top of the guard D.

F is the supply-pipe from the heater to the boilers.

G is the blow-off or waste pipe.

D is the guard, open at top and bottom. It is rigidly fixed with its lower edge below the mouth of pipe F, its top being slightly above the top of exhaust-pipe C.

The operation of the above-described apparatus is as follows: The water entering through pipe E is delivered through the perforations before described in finely-divided particles, and outside of the top of the guard D. This fine division of the descending water enables the ascending steam to come in contact with very large amounts of its surface. The water is by this means rapidly heated to the temperature necessary to induce a separation of all the salts and other foreign matter held in solution, which causes the ordinary incrustation in boilers. This foreign matter will of course fall to the bottom of the vessel A, and as the water which will pass through the pipe F into the boiler must come from within the guard D, and from a point above the bottom of the vessel, it will enter the boiler after being separated from the foreign matter. The light impurities—such as oil—introduced with the exhaust-steam will remain on the surface of the water, and cannot enter the pipe F.

The reason the lower end of the pipe B is arranged below the supply-pipe E is that the steam ascending from pipe C may not in its ascent carry the water out of pipe B. In blowing out the impurities the valve $a$ must be closed, and the necessary pressure of steam can be obtained direct from the boiler for that purpose. In Figs. 2 and 3 the level of the water is always at the top of the openings K and Q, through which the water flows into the boiler, the openings being of sufficient diameter to admit the free flowing of steam upward and water downward. The steam will always be of the same temperature as in the boiler.

In Fig. 3 the water-supply pipe T may be perforated throughout its length, except immediately above the guards R. In other respects, it is believed that the above description of Fig. 1 will answer for Figs. 2 and 3.

A modification of the combinations shown in Fig. 3, and which, it is believed, would be found to answer very well in practice, may be made as follows: Instead of having a separate guard, R, for each boiler-opening, two angular plates may be used, whose length may be the width of the stack of boilers, and placed in positions relatively to themselves and to the boiler-openings Q, that would be represented by the section of D shown in Fig. 1. In this case two water-supply pipes, T, perforated their entire length, should be used. They ought to be parallel, or nearly so, to each other, and placed at such distance apart that the water coming from them would fall upon the sides of the inclined plates before described; and, as a still further protection against the introduction of impurities into the boiler, a pipe may be placed in the heating-vessel, extending entirely around it. It should be perforated, and so placed as to take in water through those perforations at the same altitude from the bottom of the heater that the water would enter the boiler direct if such pipe were not used, and within the protection of the guards, as previously described. The end of such pipe in the heater should be entirely closed, the other end passing into the mud-drum, if there be one underneath the boiler. By this means the water would all enter the boiler through the mud-drum.

I claim—

1. The guard D, open at both ends, and surrounding, as shown, a pipe, C, for the admission of steam, and the mouth of a supply-pipe, F.

2. A pipe or entrance, C, for the admission of steam, a water-supply pipe, E, and guard D, when combined, for the purpose described.

G. WATERS.

Witnesses:
  C. L. FISHER,
  H. D. PECK.